2,830,429
ATTACHMENT FOR LAWN MOWERS

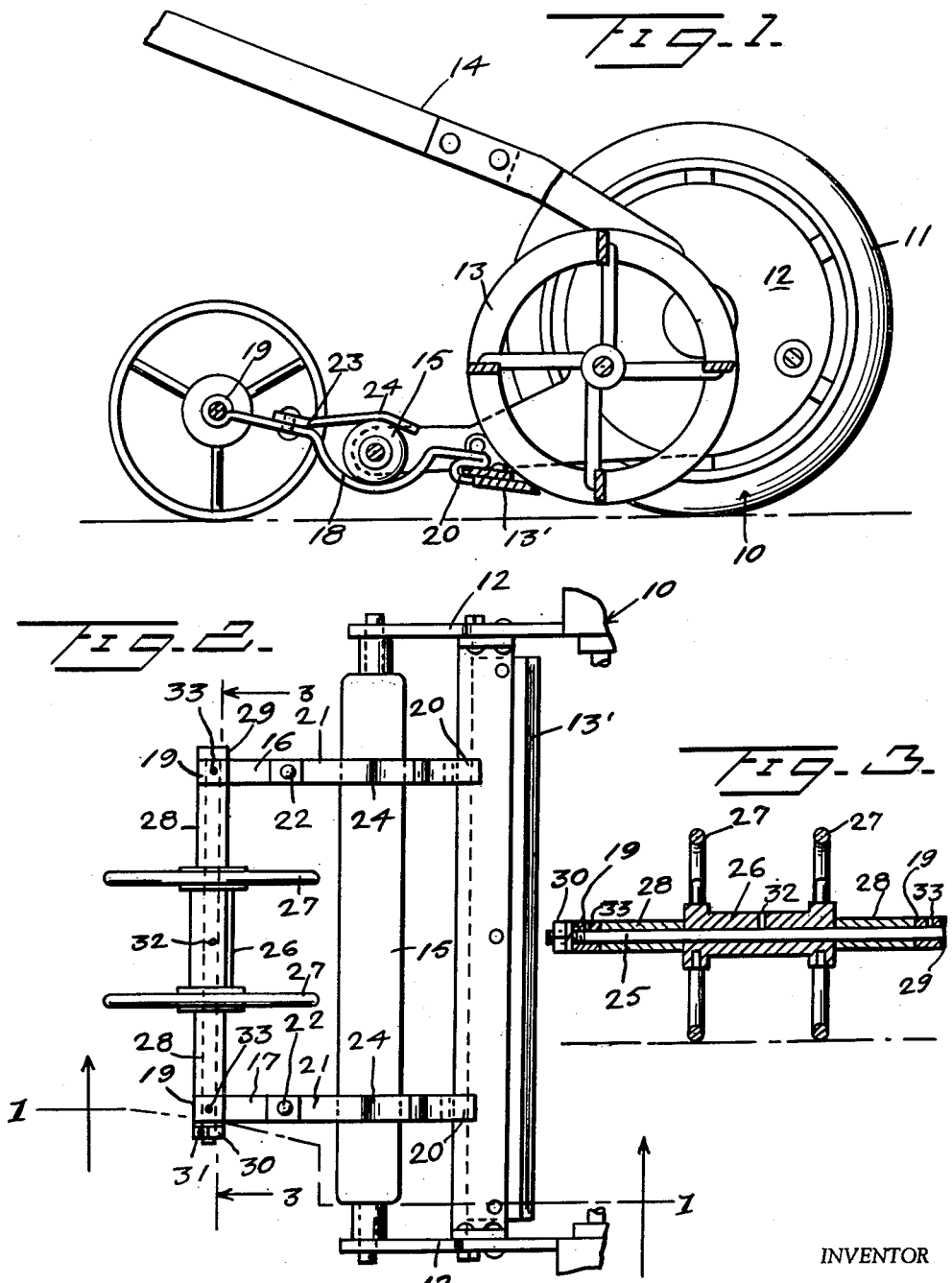

Charles J. Goeske, Henryetta, Okla.

Application March 19, 1956, Serial No. 572,439

2 Claims. (Cl. 56—249)

The present invention relates to lawn mower attachments, and more particularly, to attachments which substitute a relatively large diameter wheel for the relatively small diameter roller normally supporting the rear of a lawn mower. This invention is an improvement on my prior Patent No. 2,639,572, issued May 26, 1953, and entitled Attachment for Lawn Mowers.

The primary object of the invention is to provide an attachable friction reducing ground engaging wheel which is adapted to lift the normal lawn roller from ground engaging contact.

Another object of the invention is to provide an attachment of the class described above which can be quickly attached and detached without altering the lawn mower construction or removing parts therefrom.

A further object of the invention is to provide a lawn mower attachment of the class described having readily lubricated bearings associated therewith.

A still further object of the invention is to provide an attachment constructed as set forth above which will be inexpensive to manufacture, easy to attach and use, and durable in service.

Other objects and advantages will become apparent from the following specification when considered in the light of the attached drawings, in which:

Figure 1 is a fragmentary longitudinal section taken along the line 1—1 of Figure 2, looking in the direction of the arrows, including a ground wheel, cutting reel and handle not shown in Figure 2.

Figure 2 is a fragmentary top plan view, omitting the ground wheel, cutting reel and handle shown in Figure 1.

Figure 3 is a transverse cross-section taken along the line 3—3 of Figure 2, looking in the direction of the arrows.

Referring now to the drawings in detail wherein like reference numerals indicate like parts throughout the several figures, the reference numeral 10 indicates generally a lawn mower to which the invention is to be attached. The lawn mower 10 is provided with a pair of ground engaging drive wheels one of which is shown at 11, a frame 12 associated with each of the wheels 11, a cutting reel 13 mounted in the frame 12, and extending between the wheels 11. An adjustable stationary cutter bar 13' is adjustably secured to the frame 12 at its opposite ends and is adapted to cooperate with the cutter reel 13 in a conventional manner.

A handle 14 extends rearwardly from the frame 12 to provide means for moving the lawn mower 10 over the ground. A ground engaging roller 15 is journalled in the rear ends of the frames 12 so as to extend transversely of the lawn mower 10 rearwardly to the cutter blade 13.

The foregoing description is of a conventional lawn mower which may vary substantially in exact construction.

A pair of arms 16 and 17 are positioned in spaced apart parallel relation to extend from the rear of the lawn mower 10. The arms 16 and 17 are each provided with an arcuate downwardly offset central portion 18, a looped outer end 19, and a hook 20 formed on the inner end. The hook 20 is formed integrally with the arm 16, as illustrated in Figure 1. A resilient keeper 21 is pivotally attached to each of the arms 16 and 17 by means of a pivot rivet 22. The keeper arm 21 is upwardly offset at 23 and downwardly offset at 24 for reasons to be described.

An axle bolt 25 extends through and between the loops 19 on the arms 16 and 17 and has journalled thereon a hub 26 carrying a spaced pair of wheels 27 for engagement with the ground. Spacer bushings 28 maintain the hub 26 centrally of the axle 25 between the loops 19. The axle bolt 25 is provided with a head 29 at one end and a nut 30 at the other end which is adapted to be locked in position by means of a set screw 31. The hub 26 is provided with an oil hole 32 and the loops 19 are provided with oil holes 33 to permit the axle 25 to be lubricated to reduce friction.

In the use and operation of the invention the hook 20 is engaged over the cutter bar 13', as illustrated in Figure 1, with the arcuate offset portion 18 of the arms 16 and 17 engaged under the lawn roller 15 to support the roller 15 in spaced relation with respect to the ground. The keeper arms 21 are pivoted to overlie the ground roller 15 to maintain the attachment in position on the lawn mower 10.

The lawn mower 10 is then utilized in the normal manner with the exception that the friction is materially reduced reducing the effort required to move the lawn mower 10 over the ground.

Having thus described the preferred embodiment of the invention, it should be understood that numerous structural modifications and adaptations may be resorted to without departing from the scope of the appended claims.

What is claimed is:

1. In a lawn mower of the type having a pair of gound engaging wheels, a stationary cutter bar, and a transverse lawn roller; a pair of spaced rearwardly extending arms detachably secured to said cutter bar at their forward ends, said arms having arcuate downwardly offset central portions extending under in supporting relation and partially around said transverse roller, means detachably securing said arms to said transverse roller, a shaft journalled in the outer ends of said arms, and ground engaging wheels journalled on said shaft for supporting said arms and said transverse roller in spaced relation to the ground.

2. A device as claimed in claim 1 wherein the means for clamping said arm to said roller comprises a resilient member.

References Cited in the file of this patent

UNITED STATES PATENTS

| | | |
|---|---|---|
| 1,901,183 | McKahin | Mar. 14, 1933 |
| 2,639,572 | Goeske | May 26, 1953 |